United States Patent
Lee et al.

(10) Patent No.: US 7,327,416 B2
(45) Date of Patent: Feb. 5, 2008

(54) BACK LIGHT ASSEMBLY AND LIQUID CRYSTAL DISPLAY DEVICE HAVING THE SAME

(75) Inventors: Jeong-Hwan Lee, Suwon-si (KR); Keun-Woo Lee, Gyeonggi-do (KR); Jong-Dae Park, Seoul (KR); Jae-Ho Jung, Yongin-si (KR); Tae-Jin Lee, Gyeonggi-do (KR); Chang-Young Bang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 121 days.

(21) Appl. No.: 10/519,599

(22) PCT Filed: Jun. 24, 2003

(86) PCT No.: PCT/KR03/01231

§ 371 (c)(1),
(2), (4) Date: Dec. 22, 2004

(87) PCT Pub. No.: WO2004/003637

PCT Pub. Date: Jan. 8, 2004

(65) Prior Publication Data

US 2005/0206805 A1    Sep. 22, 2005

(30) Foreign Application Priority Data

Jun. 28, 2002 (KR) .............................. 2002-37087

(51) Int. Cl.
*G02F 1/1335* (2006.01)
*G02F 1/1333* (2006.01)

(52) U.S. Cl. .......................................... 349/65; 349/58
(58) Field of Classification Search .................. 349/65, 349/58; 362/615
See application file for complete search history.

(56) References Cited

U.S. PATENT DOCUMENTS

| | | | |
|---|---|---|---|
| 5,046,826 A | 9/1991 | Iwamoto et al. | |
| 5,394,255 A | 2/1995 | Yokota et al. | |
| 6,111,699 A | 8/2000 | Iwata et al. | |
| 6,407,781 B2* | 6/2002 | Kitada | 349/58 |
| 6,636,282 B2* | 10/2003 | Ogawa et al. | 349/58 |
| 6,958,789 B2* | 10/2005 | Cueff et al. | 349/61 |
| 7,178,963 B2* | 2/2007 | Ueda et al. | 362/615 |
| 2002/0012085 A1 | 1/2002 | Honda et al. | |
| 2002/0113924 A1* | 8/2002 | Saito et al. | 349/112 |

* cited by examiner

*Primary Examiner*—David Nelms
*Assistant Examiner*—David Chung
(74) *Attorney, Agent, or Firm*—Don C. Lawrence; MacPherson Kwok Chen & Heid LLP

(57) ABSTRACT

Disclosed are a back light assembly for preventing discoloration and deformation caused by heat generated from a lamp, and a liquid crystal display device for displaying an enhanced image. The back light assembly includes a receiving container, a lamp, a glass substrate and a diffuser. The receiving container has a receiving space. The lamp for generating the light is disposed in the receiving space. The glass substrate is interposed between the liquid crystal display panel and the lamp. The diffuser diffuses the light generated by the lamp so as to unify a luminance distribution of the liquid crystal display panel. The liquid crystal display device includes the back light assembly.

22 Claims, 9 Drawing Sheets

BACK LIGHT ASSEMBLY AND LIQUID CRYSTAL DISPLAY DEVICE HAVING THE SAME

TECHNICAL FIELD

The present invention relates to a back light assembly, and a liquid crystal display device having the back light assembly, and more particularly to a back light assembly for preventing discoloration and deformation caused by heat generated from a lamp, and a liquid crystal display device displaying an enhanced image.

BACKGROUND ART

A liquid crystal display device displays an image processed by the information-processing device, so that a user can perceive the image.

The liquid crystal display device, one of display devices, uses a liquid crystal, of which transmissivity is modulated according to electric fields so as to display an image.

The liquid crystal modulates the light transmissivity only. Therefore, the liquid crystal display device needs light passing through the liquid crystal so as to display an image.

A lamp generates the light. A Cold Cathode Fluorescent Lamp (CCFL) may be used as the lamp of the liquid crystal display device.

The cold cathode fluorescent lamp has many merits. For example, the cold cathode fluorescent lamp may be formed in a cylindrical shape having a very small diameter. The cold cathode fluorescent lamp generates white light that is similar to sunlight. The cold cathode fluorescent lamp has a long life span and generates a little amount of heat in comparison with incandescent lamp.

The cold cathode fluorescent lamp may be arranged variously according to a size of a liquid crystal display panel.

In a small sized or a middle sized liquid crystal display device, one or two cold cathode fluorescent lamps are sufficient to get enough luminance for displaying an image. In the small sized or the middle sized liquid crystal display device, a volume and a weight are important. The cold cathode fluorescent lamp is attached to a side of an optical distribution-regulating device called as a light-guide plate (LGP).

This liquid crystal display device is referred to as an edge-illumination type liquid crystal display device.

Comparatively, in a large sized liquid crystal display device, one or two cold cathode fluorescent lamps is not enough to generate sufficient luminance, because the area of effective display region is large.

Therefore, more than three cold cathode fluorescent lamps are needed to get sufficient luminance for displaying an image. In this case, the cold cathode fluorescent lamps are arranged in parallel with each other under the liquid crystal display panel for applying light to the liquid crystal display panel.

This liquid crystal display device is referred to as a direct-illumination type liquid crystal display device.

The direct-illumination type liquid crystal display device may have sufficient luminance to display an image. However, the direct-type liquid crystal display device has a variation of the luminance according to a region of the liquid crystal display panel.

A region of the liquid crystal display panel, disposed over the lamp, has a high luminance. A region of the liquid crystal display panel, disposed over a region between the lamps, has a low luminance.

Therefore, a diffusion plate is interposed between the liquid crystal display panel and the lamp so as to reduce the variation of the luminance.

In general, the diffusion plate comprises acryl resin. The diffusion plate comprising the acryl resin is light and may be easily manufactured.

However, when a display time becomes longer, specific characters of the diffusion plate comprising acryl resin becomes bad, so that display quality may be deteriorated.

Firstly, the diffusion plate comprising acryl resin gets curved or sags easily due to the heat generated by the lamp.

Secondly, the diffusion plate comprising acryl resin discolored easily due to the heat generated by the lamp. When the diffusion plate is discolored, the white light generated by the cold cathode fluorescent lamp is filtered into a different color, so that display quality becomes bad.

DISCLOSURE OF THE INVENTION

The present invention provides a back light assembly preventing discoloration and deformation caused by heat generated from a lamp, and generating light having uniform luminance.

The present invention also provides a liquid crystal display device having back light assembly preventing discoloration and deformation caused by heat generated from a lamp, and displaying an enhanced image.

The back light assembly includes a receiving container, a lamp, a glass substrate and a diffuser. The receiving container has a receiving space. The lamp for generating the light is disposed in the receiving space. The glass substrate is interposed between the liquid crystal display panel and the lamp. The diffuser diffuses the light generated by the lamp so as to make the luminance distribution of the liquid crystal display panel uniform.

The liquid crystal display device includes a receiving container, a lamp, a glass substrate, a diffusion plate and liquid crystal display panel assembly. The receiving container includes a bottom face and a sidewall. The bottom face and the sidewall form a receiving space. The lamp for generating a first light is disposed on the bottom face. The glass substrate is disposed in the receiving space. The diffusion plate includes a diffuser for diffusing the first light. When the first light is diffused, the first light is transformed into a second light. The luminance of the second light is more uniform than the luminance of the first light. The liquid crystal display panel assembly displays an image by using the second light.

The back light assembly and the liquid crystal display device according to the present invention prevent deformation and discoloration and diffuse light effectively, so that an image quality is enhanced.

BRIEF DESCRIPTION OF THE DRAWINGS

The above and other advantages of the present invention will become readily apparent by reference to the following detailed description when considered in conjunction with the accompanying drawings wherein.

BEST MODE FOR CARRYING OUT THE INVENTION

Embodiment 1

Figure 1:
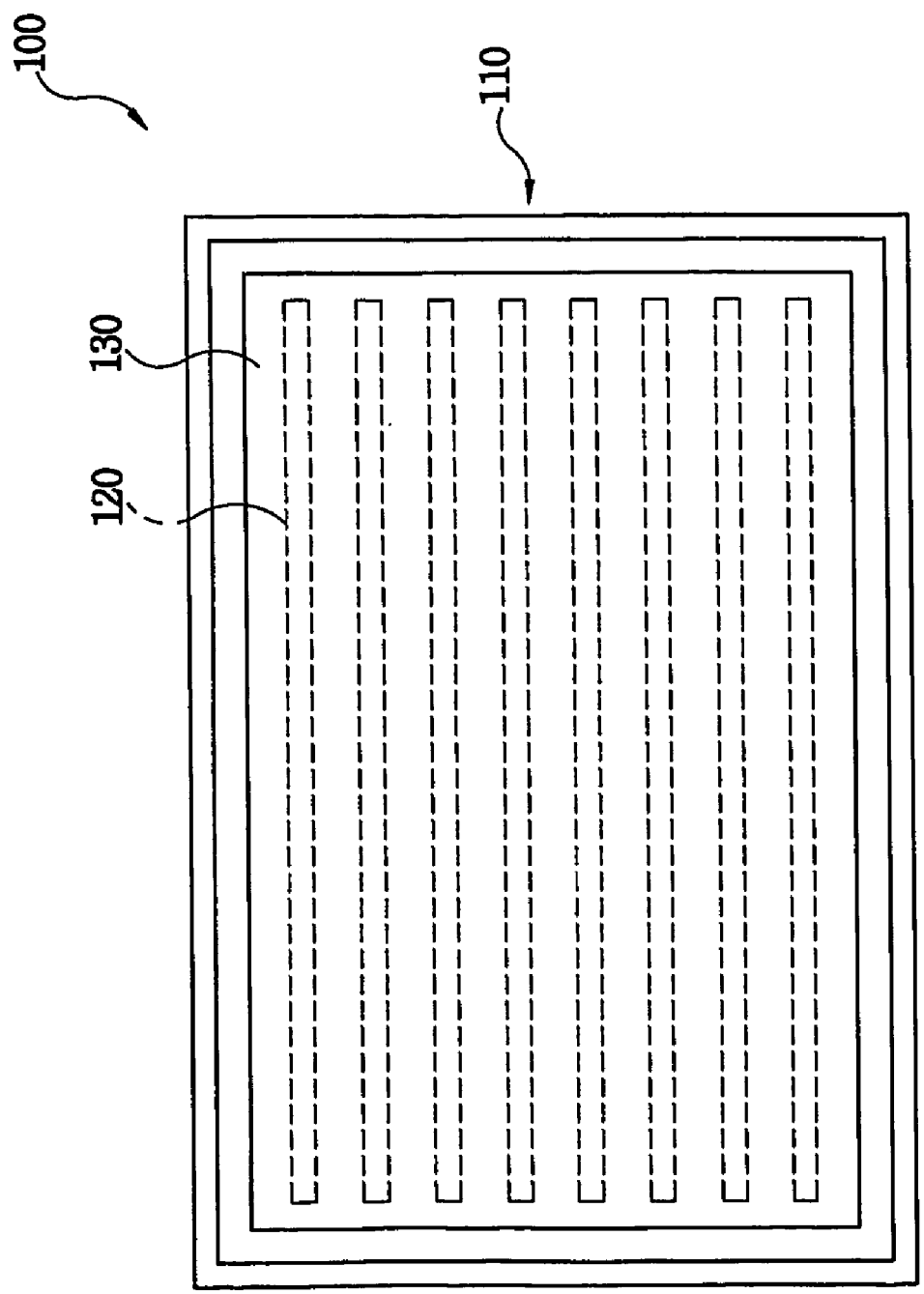
FIG. 1 is a top view showing a back light assembly according to an exemplary first embodiment of the present invention.
Figure 2:
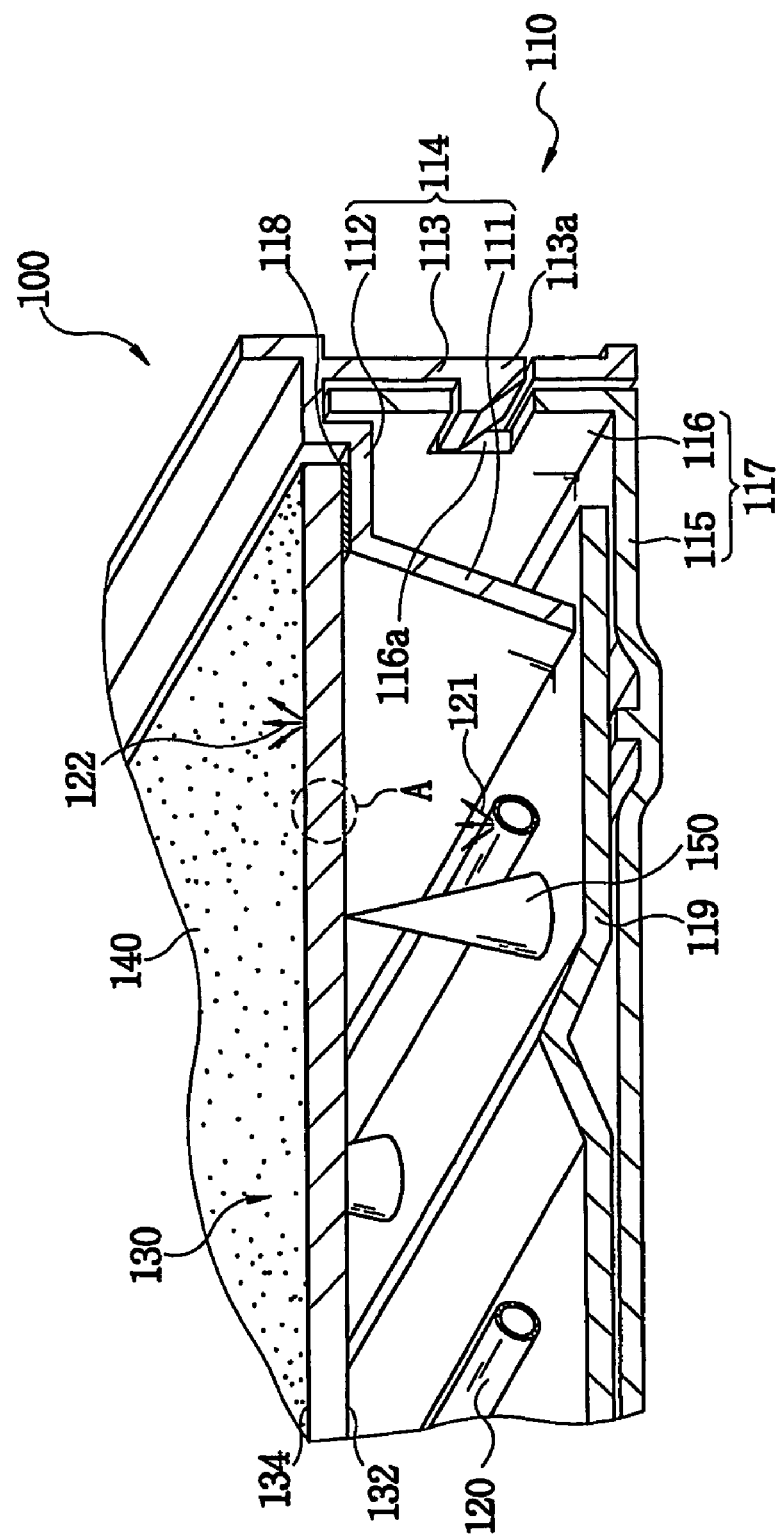
FIG. 2 is a partially cut perspective view showing a back light assembly of FIG. 1.

FIG. 1 is a top view showing a back light assembly according to an exemplary first embodiment of the present invention and FIG. 2 is a partially cut perspective view showing a back light assembly of FIG. 1.

Referring to FIGS. 1 and 2, a back light assembly 100 includes a receiving container 110, a lamp 120, a glass substrate 130 and a diffusion sheet 140.

The receiving container 110 has a receiving space for receiving the lamp 120, the glass substrate 130 and the diffusion sheet 140.

Referring to FIG. 2, the receiving container 110 includes a first receiving frame 114 and a bottom chassis 117. The first receiving frame 114 and the bottom chassis 117 form the receiving space.

The first receiving frame 114 includes a first plate 111, a second plate 112 and a third receiving plate 113.

The second plate 112 has a rectangular frame shape having an opening inside the rectangular frame. The glass substrate 130 and the diffusion sheet 140 are disposed on the second plate 112.

A top portion of the first plate 111 is connected with an inner portion of the second plate 112 and the first plate 111 is inclined inward. The first plate 111 has a lamp fixing portion (not shown) to fix the lamp 120 thereto.

A top portion of the third plate 113 is connected with an outer portion of the second plate 112. A hook 113a is formed at a lower portion of the third plate 113 and is combined with a bottom chassis 117.

The bottom chassis 117 includes a bottom face 115 and a sidewall 116 protruding upward from the outer portion of the bottom face 115. A hook hole 116a corresponding to the hook 113a is formed on the sidewall 116 of the bottom chassis 117.

The lamp 120 is supported by the first plate 111 of the first receiving frame 114 and is supplied with electric power to generate first light 121.

Preferably, a cold cathode fluorescent lamp may be used as the lamp 120. A plurality of the lamps 120 is arranged to be parallel with each other on the bottom face 115 of the bottom chassis 117.

A reflecting plate 119 is interposed between the lamp 120 and the bottom face 115. The reflecting plate 119 reflects a portion of the first light generated by the lamp 120 toward the glass substrate 130.

The lamps 120 generating linear light are disposed in parallel with each other, so that a luminance distribution of the first light 121 is non-uniform.

The luminance difference between a first region disposed over the lamp 120 and a second region deviated from the lamps 120 is a maximum.

When the luminance distribution is non-uniform, brightness of image displayed on a liquid crystal display panel is also non-uniform. Therefore, a display quality is lowered.

In order to prevent a deterioration of the display quality, members (not shown) for making the luminance distribution uniform are disposed over the lamp 120. Hereinafter, the members for making the luminance distribution of the first light 121 uniform are explained in detail.

Figure 3:
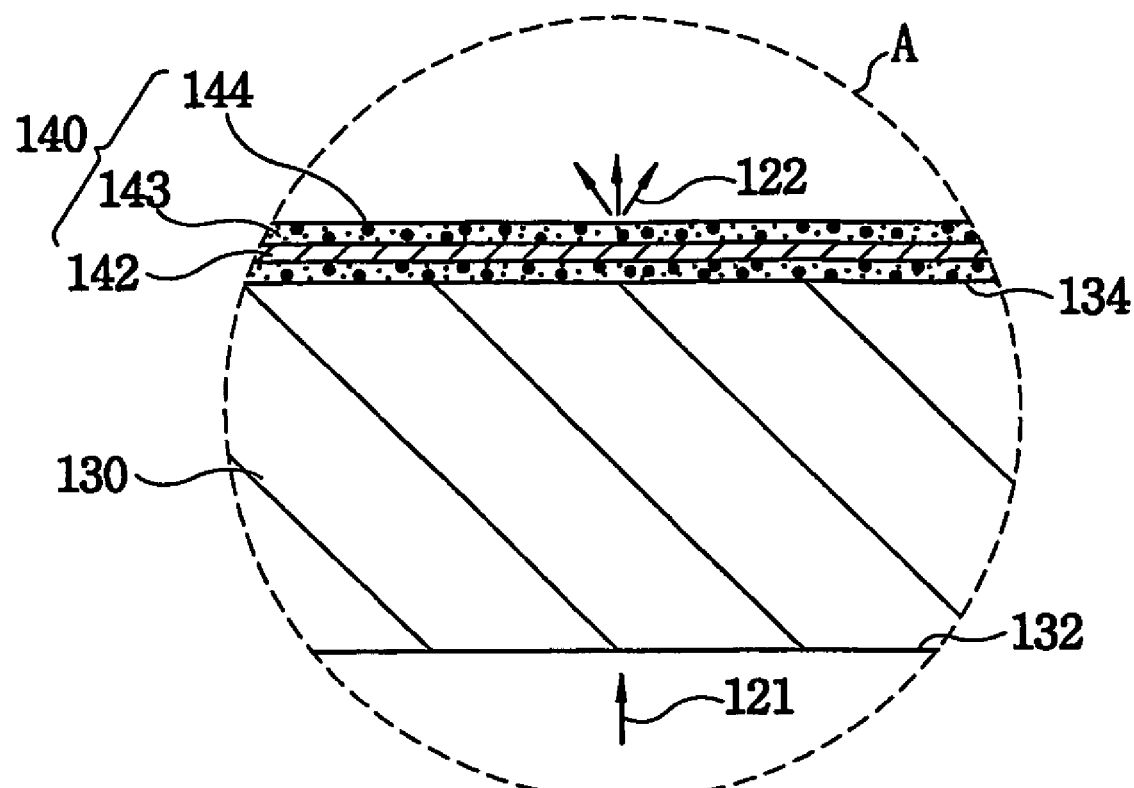
FIG. 3 is an enlarged view showing a portion "A" of FIG. 2.

FIG. 3 is an enlarged view showing a portion "A" of FIG. 2.

Referring to FIG. 3, the glass substrate 130 and the diffusion sheet 140 are disposed on the second plate 112 of the first receiving frame 115.

The glass substrate 130 seldom gets curved or sags due to the heat generated by the lamp, when the lamp 120 generates the first light 112.

Further, the glass substrate 130 seldom is discolored, even though the glass substrate 130 is exposed for a long time to the first light 121 generated the lamp 120.

However the glass substrate 130 is fragile. Therefore, an impact-proof glass or a tempered glass may be used as the glass substrate 130. The tempered glass has a low thermal expansion coefficient and is impervious to an external impact.

The thicker the glass substrate 130 is, the more impervious is the liquid crystal display device to the external impact. However, the thicker the glass substrate 130 is, the heavier is the liquid crystal display device. Therefore, the thickness of the glass substrate is determined in consideration of the strength and the weight. Preferably, the thickness of the glass substrate 130 is about 2 mm.

Referring to FIG. 2, an impact-absorbing member 118 may be interposed between the second plate 112 and the glass substrate 130.

The impact-absorbing member 118 absorbs an external impact so that the external impact force may not be transferred to the glass substrate 130.

The glass substrate 130 includes a first face 132 and a second face 134. The first light 121 generated by the lamp 120 is incident onto the first face 132 and exits from the second face 134.

The glass substrate 130 seldom gets curved and is discolored. However, the glass substrate 130 is transparent, so that the variation of the luminance occurs due to discretely disposed lamps 120. Therefore, the diffusion sheet 140 is disposed over the glass substrate 130 so as to reduce the variation of the luminance.

Referring to FIG. 3, the diffusion sheet 140 includes a diffusion sheet body 142 and a light diffusion bead 144. The light diffusion beads 144 are mixed with a binder 143. The binder 143 is transparent, and the binder 143 has adhesive property. The light diffusion beads 144 mixed with the binder 143 are disposed on both side of the diffusion sheet body 142.

An amount of the light diffusion bead 144 is modulated, such that the Haze value is higher than about 90%.

The Haze value is a barometer indicating the transmittance and a ratio of diffusion of the first light 121 that is incident from the diffusion sheet 140. The Haze value is defined as follows.

Haze value=(an amount of transmitted and diffused light/total amount of transmitted light)×100   <Expression 1>

"The amount of transmitted and diffused light" is referred to as an amount of light that passes through the diffusion sheet 140 and is diffused. "The total amount of light" is referred to as total amount of light that pass through the diffusion sheet 140.

The diffusion sheet 140 is disposed on the second face 134 of the glass substrate 130 such that the Haze value is higher than about 90%.

Referring to FIG. 2, when the glass substrate 130 is large, the glass substrate 130 may sag due to the weight thereof. Therefore, a substrate-supporting member 150 is formed on the bottom face 115 of the bottom chassis 117 so as to prevent the sag of the glass substrate 130. The substrate-supporting member 150 has a cone-shape. However, the substrate-supporting member 150 may have a cylindrical shape, a triangular pillar shape or a polygonal pillar shape.

The first light 121 passes through the glass substrate 130 and passes through the diffusion sheet 140 so that the first light is transformed into a second light 122 that is diffused by the diffusion sheet 140.

Embodiment 2

Figure 4:
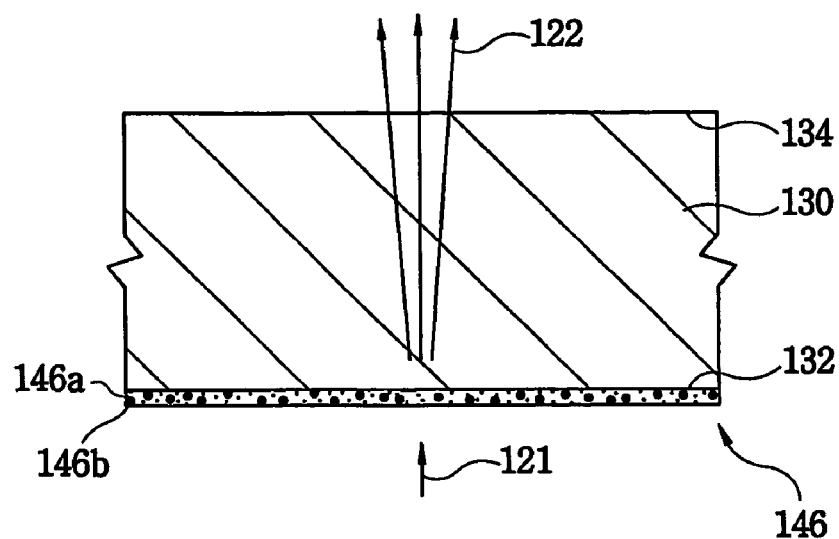
FIG. 4 is a cross-sectional view showing a portion of a glass substrate according to an exemplary second embodiment of the present invention.
Figure 5:
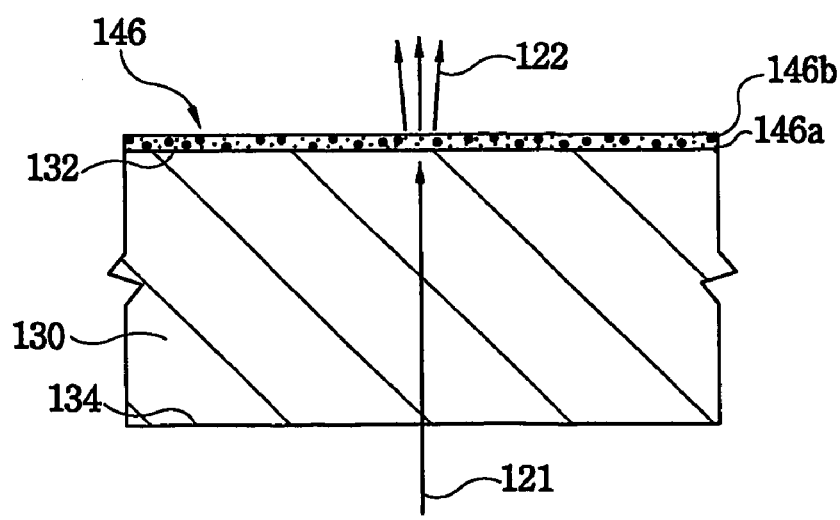
FIG. 5 is a cross-sectional view showing a portion of a glass substrate according to a modified second embodiment of the present invention.

FIG. 4 is a cross-sectional view showing a portion of a glass substrate according to an exemplary second embodiment of the present invention, and FIG. 5 is a cross-sectional view showing a portion of a glass substrate according to a modified second embodiment of the present invention.

Referring to FIGS. 2, 4 and 5, the glass substrate 130 is disposed on the second plate 112 of the first receiving frame 114. The diffusion sheet 146 is disposed on the glass substrate 130. The glass substrate 130 includes a first face 132 and a second face 134. Light generated by the lamp 120 is incident onto a first face 132 of the glass substrate 130. The first face 132 faces a second face 134 of the glass substrate 130.

Referring to FIG. 4, a light diffusion layer 146 is formed on the first face 132 of the glass substrate 130.

The light diffusion layer 146 includes a binder 146a and a light diffusion bead 146b. The binder 146a is transparent and adhesive. The light diffusion bead 146b has a grain-shape. The light diffusion bead 146b diffuses light.

The light binder 146a mixed with a pre-determined amount of the diffusion bead 146b is coated on the first face 132 of the glass substrate 130 by a predetermined thickness.

The light diffusion layer 146 diffuses the first light 121 generated by the lamp 120, so that the first light 121 is transformed into a second light 122. The second light 122 is incident onto the first face 132 of the glass substrate 130, and the second light 122 exits from the second face 134 of the glass substrate 130.

In FIG. 5, the light diffusion layer 146 is formed on the second face 134 of the glass substrate 130.

The light diffusion layer 146 formed on the second face 134 of the glass substrate 130 includes a binder 146a and a light diffusion bead 146b. The binder 146a is transparent and adhesive. The light diffusion bead 146b has a grain-shape. The light diffusion bead 146b diffuses light.

The binder 146a is mixed with a predetermined amount of the diffusion bead 146b and coated on the second face 134 of the glass substrate 130 by predetermined thickness.

The light diffusion layer 146 diffuses the first light 121 generated by the lamp 120, so that the first light 121 is transformed into the second light 122.

Preferably, the light diffusion layer 146 formed on the first face 132 or on the second face 134 has the Haze value that is higher than about 90%.

Embodiment 3

Figure 6:
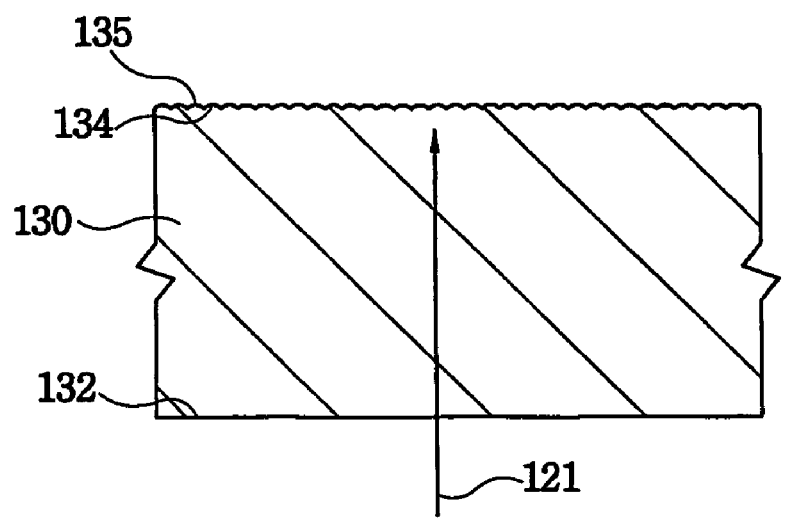
FIG. 6 is a cross-sectional view showing a portion of a glass substrate according to an exemplary third embodiment of the present invention.
Figure 7:
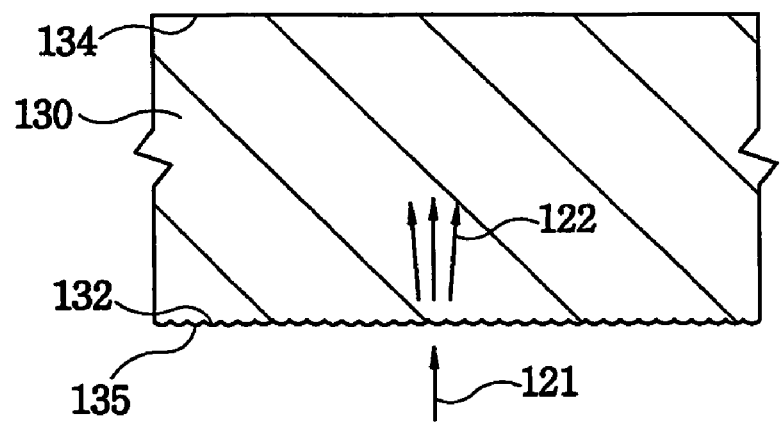
FIG. 7 is a cross-sectional view showing a portion of a glass substrate according to a modified third embodiment of the present invention.

FIG. 6 is a cross-sectional view showing a portion of a glass substrate according to an exemplary third embodiment of the present invention, and FIG. 7 is a cross-sectional view showing a portion of a glass substrate according to a modified third embodiment of the present invention.

A light diffusion portion 135 is formed on a glass substrate 130. For example, an impact-proof glass or a tempered glass may be used as the glass substrate 130. The tempered glass has a low thermal expansion coefficient. The tempered glass is impervious to external impact.

A first light 121 generated by the lamp 120 is incident onto a first face 132 of the glass substrate 130. The first face 132 faces a second face 134.

Referring to FIGS. 6 and 7, the light diffusion portion 135 is formed on the first face 132 or on the second face 134.

The light diffusion portion 135 may be formed via various manufacturing methods. For example, the light diffusion portion 135 may be formed via the sand blaster process on the first face 132 or on the second face 134 of the glass substrate 130 having plate-shape, or a roller may roll on the face of the glass substrate 130 to make an embossing pattern on the face of the glass substrate 130, when the glass substrate is not completely hardened.

The light diffusion portion 135 diffuses the first light 121 generated by the lamp 120 so as to make a luminance of light uniform.

Preferably, the light diffusion portion 135 formed on the first face 132 or on the second face 134 has the Haze value that is higher than about 90%.

Embodiment 4

Figure 8:
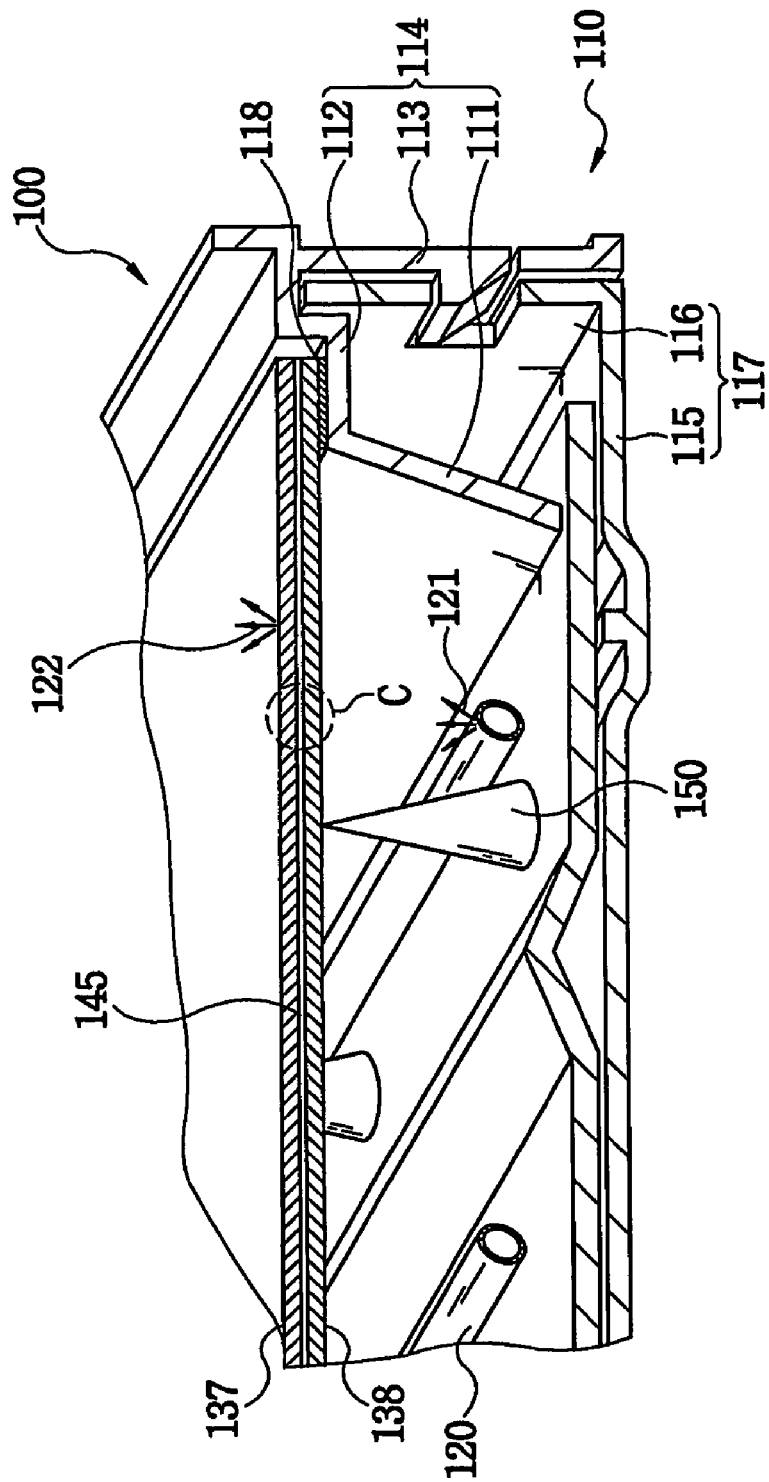
FIG. 8 is a partially cut perspective view showing a back light assembly according to an exemplary fourth embodiment of the present invention.
Figure 9:
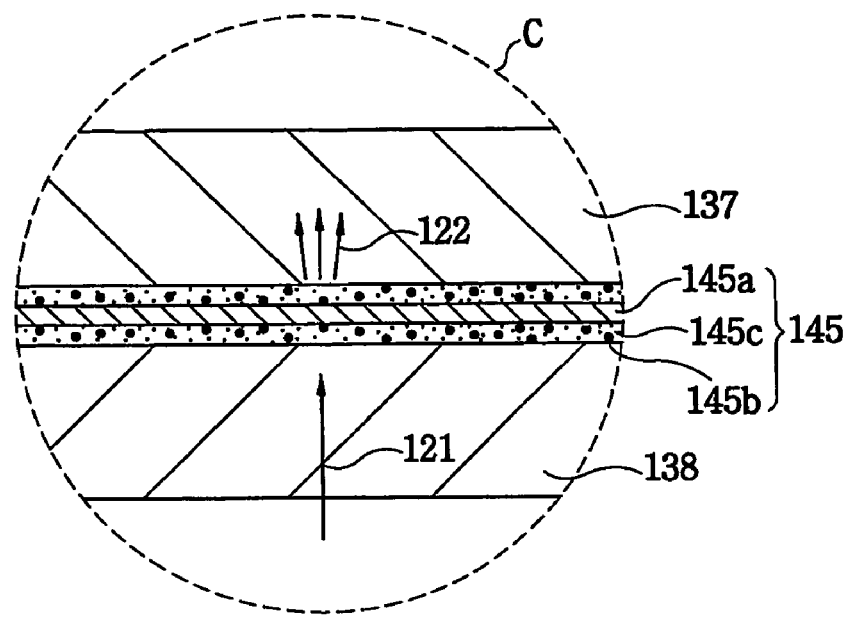
FIG. 9 is an enlarged view showing "C" of FIG. 8.

FIG. 8 is a partially cut perspective view showing a back light assembly according to an exemplary fourth embodiment of the present invention and FIG. 9 is an enlarged view showing "C" of FIG. 8.

In FIG. 8, the same reference numerals denote the same elements in FIG. 2, and thus the detailed descriptions of the same elements will be omitted Referring to FIG. 8, a glass substrate includes a first glass plate 137 and a second glass plate 138. A structure of the glass substrate having the two plates seldom is deformed or sags. The first glass plate 137 and the second glass plate 138 are disposed on the second plate 112 of the first receiving frame 114. A diffusion sheet 145 is interposed between the first glass plate 137 and the second glass plate 138.

Referring to FIG. 9, a diffusion sheet 145 includes a diffusion sheet body 145a and a light diffusion bead 145b. The light diffusion bead 145b is mixed with binder 145c and coated on the diffusion sheet body 145a.

An amount of the light diffusion bead 145b is modulated, such that the Haze value is higher than about 90%.

For example, a thickness of the glass substrate including the first glass plate 137, the diffusion sheet 145 and the second glass plate 138 is about 2 mm. Therefore, the thickness and the weight of the liquid crystal display device are reduced.

Figure 10:
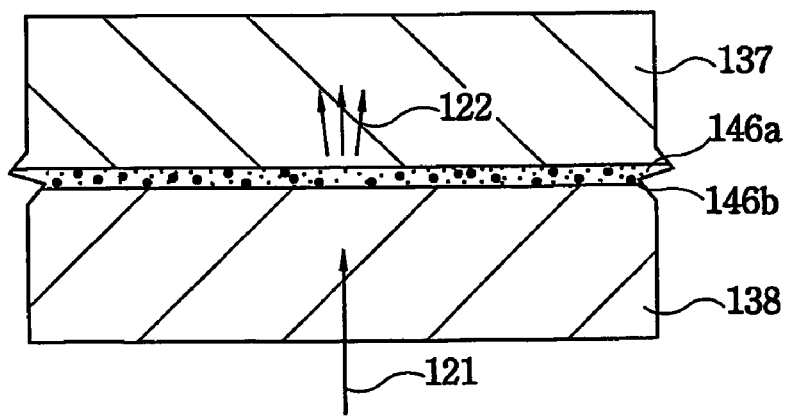
FIG. 10 is a cross-sectional view showing a first glass plate and a second glass plate according to a modified fourth embodiment of the present invention.

FIG. 10 is a cross-sectional view showing a first glass plate and a second glass plate according to a modified fourth embodiment of the present invention.

Referring to FIG. 10, a glass substrate includes a first glass plate 137 and a second glass plate 138. This structure of the glass substrate having the two plates seldom is deformed or sags. A light diffusion layer 146 is interposed between the first glass plate 137 and the second glass plate 138. The light diffusion layer 146 transforms a first light 121 generated by the lamp 120 into a second light 122.

The light diffusion layer 146 includes a light diffusion bead 146b and a binder 146a. The binder 146a mixed with the light diffusion bead 146b is coated on the first glass plate 137 or on the second glass plate 138.

Figure 11:
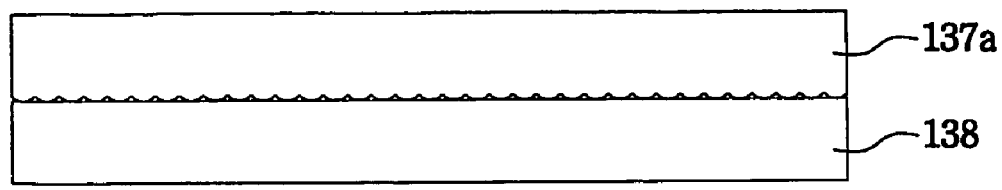
FIG. 11 is a cross-sectional view showing a glass substrate according to an exemplary fifth embodiment of the present invention.
Figure 12:
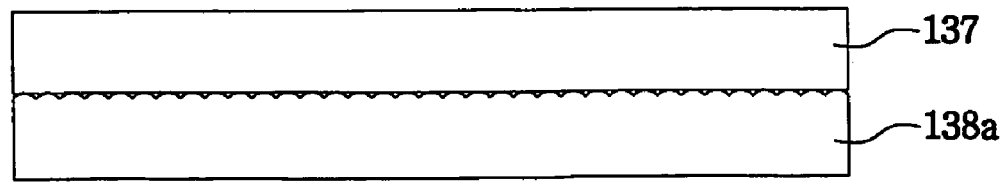
FIG. 12 is a cross-sectional view showing a glass substrate according to a modified fifth embodiment of the present invention.

FIG. 11 is a cross-sectional view showing a glass substrate according to an exemplary fifth embodiment of the present invention, and FIG. 12 is a cross-sectional view showing a glass substrate according to a modified fifth embodiment of the present invention.

Referring to FIG. 11, a glass substrate includes a first glass plate 137a and a second glass plate 138. A lower face of the first glass plate 137a has an embossing pattern. The lower face of the first glass plate 137a faces the second plate 138.

Referring to FIG. 12, a glass substrate includes a first glass plate 137 and a second glass plate 138a. An upper face of the second glass plate 138a has an embossing pattern. The upper face of the second glass plate 138a faces the first plate 137.

Both of a face of the first plate and a face of the second plate may have the embossing pattern.

Hereinafter, a liquid crystal display device having the back light assembly described above is disclosed in detail.

Figure 13:
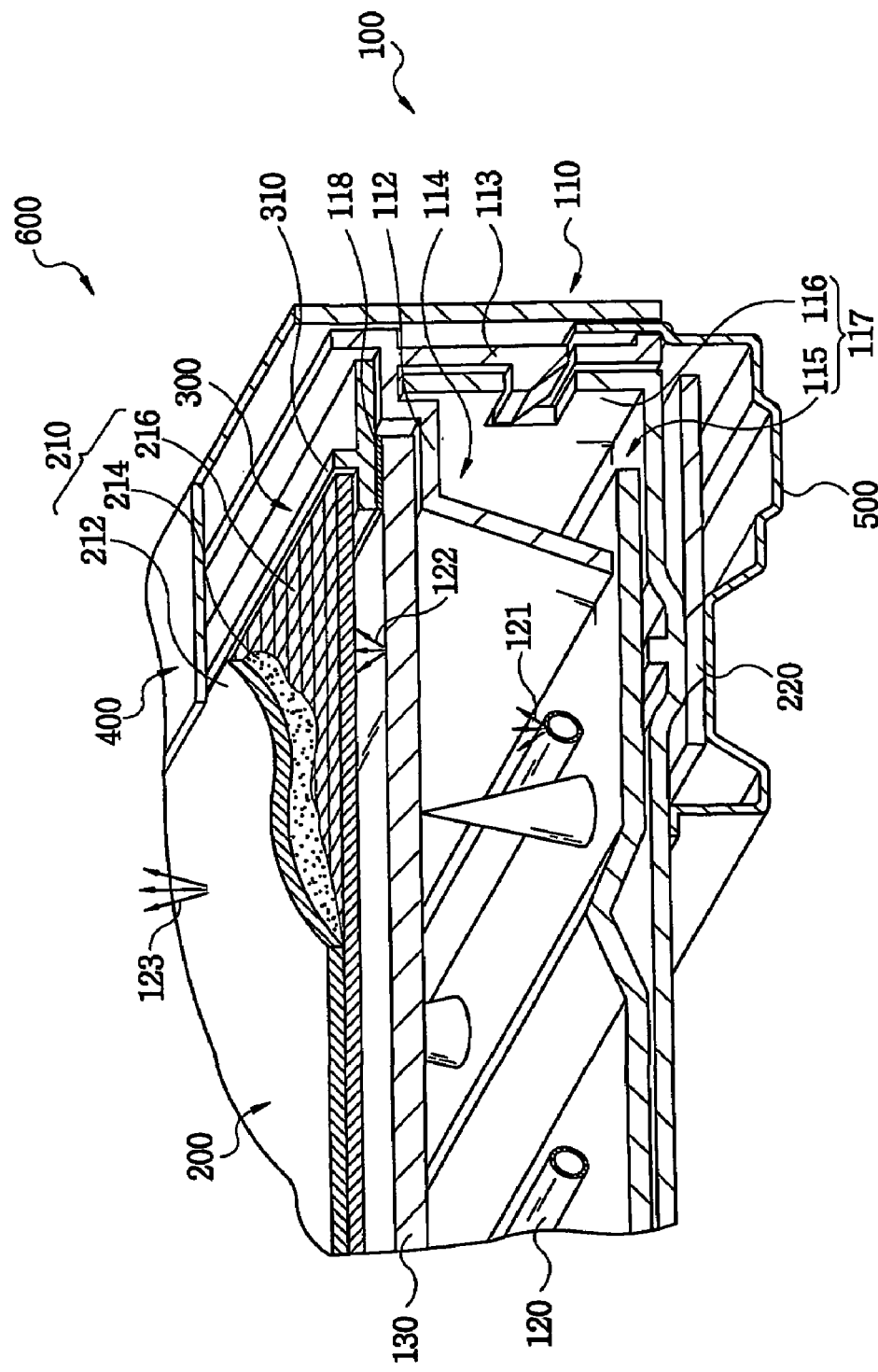
FIG. 13 is a partially cut perspective view showing a back light assembly according to an exemplary embodiment of the present invention.

FIG. 13 is a partially cut perspective view showing a back light assembly according to an exemplary embodiment of the present invention.

A liquid crystal display device 600 includes a first receiving frame 110, a back light assembly 100, a liquid crystal display panel assembly 200, a second receiving frame 300, a top chassis 400 and a back cover 500. The back light assembly 100 includes a lamp 120 for generating first light 121, a glass substrate 130 and a diffusion plate. The diffusion plate includes a diffusion sheet 140 for transforming the first light 121 into a second light 122, a light diffusion layer or a light diffusion portion.

The back light assembly 100 may be one of the embodiments disclosed above.

The second receiving frame 300 is in contact with an edge portion of the glass substrate 130 disposed on a second plate 112 of the first receiving frame 110 so as to fix the glass substrate 130.

The second receiving frame 300 has a rectangular shape. A liquid crystal display panel guide 310 is formed on the second receiving frame 300 so as to guide the liquid crystal display panel assembly 200.

An impact-absorbing member 118 may be interposed between the second receiving frame 300 and the glass substrate 130 so as to absorb an external impact transferred to the glass substrate 130, and so as to support the glass substrate 130.

The liquid crystal display panel assembly 200 is disposed on the second receiving frame 300. The second receiving frame 300 supports the liquid crystal display panel assembly 200. A liquid crystal display panel guide 310 fixes the liquid crystal display panel assembly 200.

The liquid crystal display panel assembly 200 includes a liquid crystal display panel 210, a tape carrier package (not shown) and a printed circuit board 220.

The liquid crystal display panel 210 includes a thin film transistor substrate 216, a liquid crystal 214 and a color filter substrate 212.

A first end of the tape carrier package is connected to the thin film transistor substrate 216 and a second end of the tape carrier package is connected to the printed circuit board 220.

The printed circuit board 220 is bent in accordance with a bottom chassis 117 of the back light assembly 100 to be disposed under the bottom face 115 of the bottom chassis 117. A back cover 500 fixes the printed circuit board 220 disposed under the bottom face 115.

The top chassis 400 presses an edge portion of the liquid crystal display panel 210 to fix the liquid crystal display panel 210 and protects the liquid crystal display panel 210 and the glass substrate 130.

Hereinafter, a process of displaying an image is explained.

The lamp 120 generates the first light 121. The first light 121 is incident onto the glass substrate 130 and passes through the glass substrate 130. Then the first light 121 is incident onto the light diffusion sheet, the light diffusion layer or the light diffusion portion described above. The light diffusion sheet, the light diffusion layer or the light diffusion portion diffuses the first light 121, so that the first light 121 is transformed into the second light 122 having uniform luminance.

In order to transform the first light 121 into the second light 122, the diffusion sheet having the light diffusion bead may be disposed on the glass substrate.

In order to transform the first light 121 into the second light 122, the light diffusion layer may be formed on the glass substrate 130.

In order to transform the first light 121 into the second light 122, the glass substrate may have the light diffusion portion which is an embossing pattern formed on a face of the glass substrate 130.

The first light 121 passes through the diffusion sheet, the light diffusion layer or the light diffusion portion to be transformed into the second light 122. The second light 122 may be diffused additionally. The second light 122 is applied to the liquid crystal display panel 210.

The liquid crystal display panel 210 transforms the second light 122 into an image light 123 having image information. When the image light 123 arrives at eyes of user, the user perceives an image of the image information.

INDUSTRIAL APPLICABILITY

The back light assembly according to embodiments of the present invention reduces the variation of the luminance distribution and prevents concentration of light. The back light assembly also prevents discoloration. Therefore, the back light assembly enhances the display quality.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The invention claimed is:

1. A back light assembly for applying light to a liquid crystal display panel, comprising:
   a receiving container having a receiving space and a plate defining first and second ledges extending at least partially about an upper periphery thereof,
   the second ledge being disposed above the first ledge and having an inner edge generally coincident with or disposed outside of an outer edge of the first ledge such that the first and second ledges do not overlap;
   a lamp disposed in the receiving space, for generating the light; and,
   a diffuser for diffusing the light generated by the lamp so as to make uniform a luminance distribution of the liquid crystal display panel.

2. The backlight assembly of claim 1, further comprising a glass substrate interposed between the liquid crystal display panel and the lamp and having an outer periphery supported on the first ledge of the receiving container plate.

3. The back light assembly of claim 2, wherein the diffuser is a first diffusion sheet disposed on a first face of the glass substrate, the first face facing the liquid crystal display panel.

4. The back light assembly of claim 3, wherein the first diffusion sheet comprises a first diffusion sheet body having an upper face and a lower face, and a light diffusion bead disposed on the upper face and the lower face.

5. The back light assembly of claim 2, wherein a bottom face of the receiving container includes a substrate-supporting member for supporting the glass substrate.

6. The back light assembly of claim 2, wherein the glass substrate comprises a first glass plate, a second glass plate and a second diffusion sheet interposed between the first glass plate and the second glass plate.

7. The back light assembly of claim 6, wherein the second diffusion sheet comprises a second diffusion body and a light diffusion bead disposed on both faces of the second diffusion body.

8. The back light assembly of claim 2, wherein the diffuser comprises a binder and a light diffusion bead mixed with the binder, the binder being disposed on a first face of the glass substrate, the first face facing the lamp.

9. The back light assembly of claim 2, wherein the diffuser comprises a binder and a light diffusion bead mixed with the binder, the binder being disposed on a second face of the glass substrate, the second face facing the liquid crystal display panel.

10. The back light assembly of claim 2, wherein the diffuser is an embossing pattern formed on a first face of the glass substrate, the first face facing the lamp.

11. The back light assembly of claim 2, wherein the diffuser is an embossing pattern farmed on a second face of the glass substrate, the second face facing the liquid crystal display panel.

12. The back light assembly of claim 2, wherein the diffuser has a Haze value higher than about 90%.

13. The back light assembly of claim 2, wherein the glass substrate comprises two glass plates, and the diffuser is an embossing pattern formed on at least one face of the two glass plates, the face being disposed between the two glass plates.

14. The back light assembly of claim 2, wherein the glass substrate comprises a first glass plate, a second glass plate, a bead and a binder; the bead being mixed with the binder and interposed between the first glass plate and the second glass plate.

15. A liquid crystal display device, comprising:
   a receiving container including a bottom face, a sidewall and a plate defining first and second ledges extending at least partially about an upper periphery thereof, the bottom face and the sidewall forming a receiving space, and the second ledge being disposed above the first ledge and having an inner edge generally coincident with or disposed outside of an outer edge of the first ledge such that the first and second ledges do not overlap;
   a lamp disposed on the bottom face, for generating a first light;
   a diffusion plate including a diffuser for diffusing the first light so as to transform the first light into a second light having a more uniform luminance than the first light; and,
   a liquid crystal display panel assembly having an outer periphery supported on the second ledge of the receiving container plate for displaying an image by using the second light.

16. The liquid crystal display device of claim 15, further comprising a glass substrate disposed in the receiving space and having an outer periphery supported on the first ledge of the receiving container plate, the first light advancing toward the glass substrate.

17. The liquid crystal display device of claim 16, wherein the diffuser is an embossing pattern formed on a first face of the glass substrate, the first face facing the lamp.

18. The liquid crystal display device of claim 16, wherein the diffuser is an embossing pattern formed on a second face of the glass substrate, the second face facing the liquid crystal display panel.

19. The liquid crystal display device of claim 16, wherein the diffuser is a diffusion sheet disposed on a second face of the glass substrate, the second face facing the liquid crystal display panel.

20. The liquid crystal display device of claim 19, wherein the diffusion sheet comprises a diffusion sheet body and a light diffusion bead for diffusing the first light, the light diffusion bead being mixed with a binder and disposed on both face of the diffusion sheet body.

21. The liquid crystal display device of claim 16, wherein the glass substrate comprises a first glass plate, a second glass plate, a bead and a binder; the bead being mixed with the binder and interposed between the first glass plate and the second glass plate.

22. The liquid crystal display device of claim 16, wherein the glass substrate comprises two glass plates, and the diffuser is an embossing pattern formed on at least one face of the two glass plates, the face being disposed between the two glass plates.

* * * * *